United States Patent
Morishima et al.

(10) Patent No.: US 7,105,243 B2
(45) Date of Patent: Sep. 12, 2006

(54) FUEL CELL SYSTEM WORKING TO CONTROL SUPPLY PRESSURE OF FUEL ACCURATELY

(75) Inventors: Shingo Morishima, Toyota (JP); Masahiko Suzuki, Hoi-gun (JP)

(73) Assignee: Denso Corporation, Kariya (JP)

(*) Notice: Subject to any disclaimer, the term of this patent is extended or adjusted under 35 U.S.C. 154(b) by 398 days.

(21) Appl. No.: 10/615,931

(22) Filed: Jul. 10, 2003

(65) Prior Publication Data
US 2004/0081869 A1    Apr. 29, 2004

(30) Foreign Application Priority Data
Jul. 10, 2002    (JP)    ............................. 2002-201096
May 7, 2003    (JP)    ............................. 2003-129171

(51) Int. Cl.
*H01M 8/04*    (2006.01)
(52) U.S. Cl. ........................................ 429/25; 429/34
(58) Field of Classification Search ................. 429/22, 429/23, 25, 26, 34
See application file for complete search history.

(56) References Cited

U.S. PATENT DOCUMENTS 3,585,077 A * 6/1971 Waldman .................. 429/23 X
3,982,961 A * 9/1976 Grasso ......................... 429/34
5,441,821 A * 8/1995 Merritt et al. ............ 429/25 X
6,447,939 B1 * 9/2002 Iwasaki ..................... 429/22 X
6,864,003 B1 * 3/2005 Ueda et al. .................... 429/25

FOREIGN PATENT DOCUMENTS

JP        09-213353         *    8/1997
JP        A 9-213353              8/1997
JP        A 2001-266922           9/2001

OTHER PUBLICATIONS

Translation of JP 09-213,353 "Detailed Description" section, from the Japanese Patent Office website, (doc date Aug. 1997).*

* cited by examiner

*Primary Examiner*—Stephen J. Kalafut
(74) *Attorney, Agent, or Firm*—Oliff & Berridge PLC

(57) ABSTRACT

A fuel cell system is provided which includes an off-gas recirculating mechanism working to mix an off-gas discharged from a fuel cell with a hydrogen gas supplied to the fuel cell. The off-gas recirculating mechanism is implemented by an ejector vacuum pump which is controllable of an area of an outlet thereof to bring an output pressure into agreement with a target one. Use of such a type of ejector vacuum pump ensures desired accuracy of recirculation of the off-gas and regulation of the pressure of fuel supplied to the fuel cell.

15 Claims, 3 Drawing Sheets

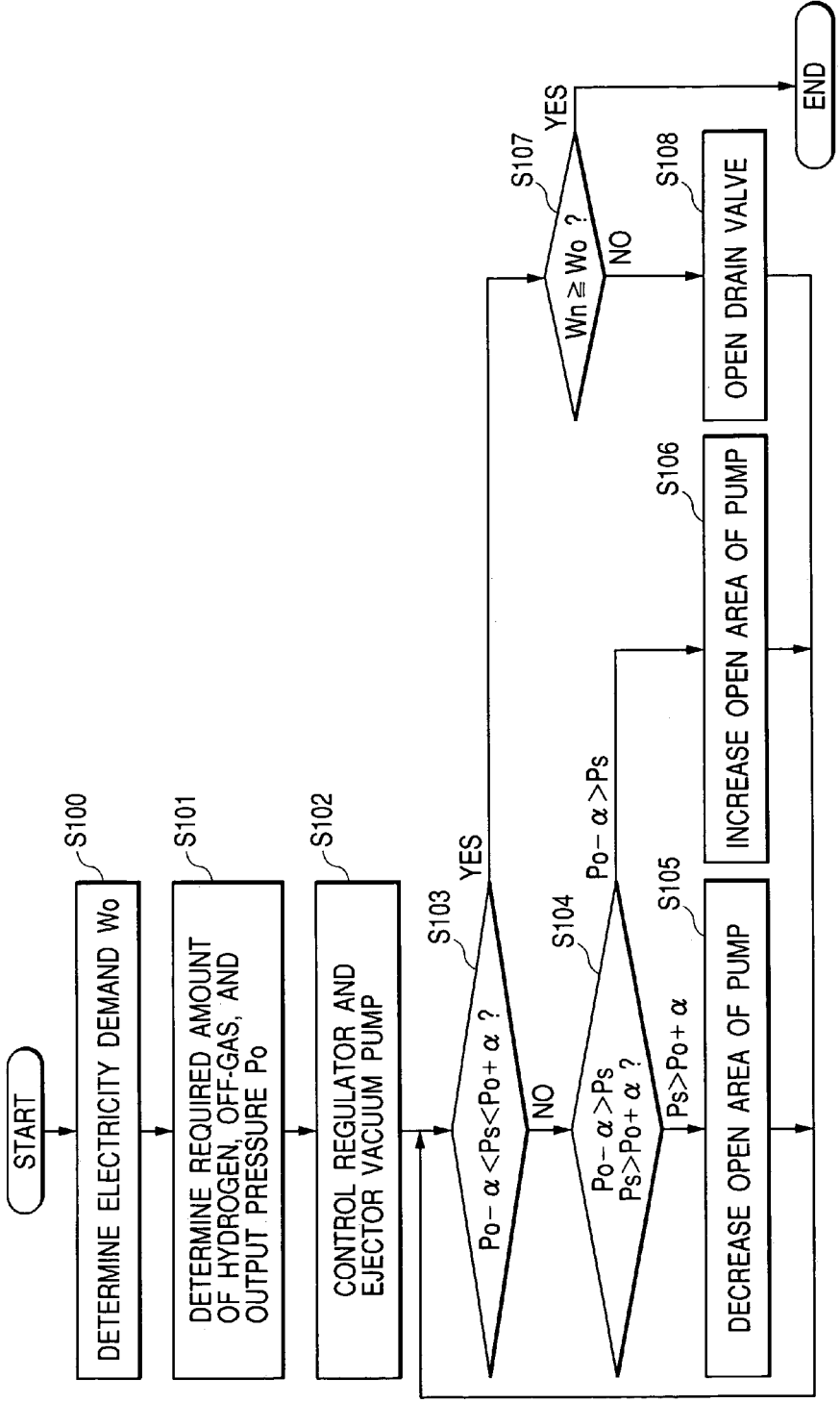

FUEL CELL SYSTEM WORKING TO CONTROL SUPPLY PRESSURE OF FUEL ACCURATELY

BACKGROUND OF THE INVENTION

1. Technical Field of the Invention

The present invention relates generally to a fuel cell system suitable for vehicles, boats, ships, or portable generators which is equipped with a fuel cell working to convert the energy produced by electrochemical reaction of oxygen and hydrogen into electric power and designed to control a supply pressure of fuel with high accuracy.

2. Background Art

There are known fuel cell systems designed to suck an off-gas discharged from a fuel electrode of a fuel cell using a pump and mix it with a fuel supplied to the fuel cell. The pump is usually implemented by an ejector vacuum pump equipped with an ejector nozzle since it is capable of employing fluid energy of the supplied fuel for power saving.

Usually, the fuel cell systems are required to keep a supplied pressure of fuel at a given value in order to decrease a pressure difference between an oxygen electrode and a fuel electrode, stabilize output of the fuel cell, and purge moisture away from the fuel electrode. The ejector vacuum pump is, however, subjected to variation in pressure of fuel at an outlet thereof (i.e., a supplied pressure of the fuel) and flow rate of recirculated off-gas due to variations in pressure and flow rate of the fuel supplied to the fuel cell. The ejector vacuum pump also suffers from a drawback in that a controllable range of the flow rate of the off-gas is narrow.

Japanese Patent First Publication No. 2001-266922 discloses a fuel cell system which has pressure controlling lines and a plurality of pressure control valves capable of being controlled as a function of pressure in an oxidizing agent supplier.

The above system, however, has drawbacks in that the structure made up of the pressure control valves and the bypass lines is complex, control of the pressure of fuel supplied to the fuel cell depends upon the supplied pressure of the oxidizing agent, thereby making it difficult to meet a high-accuracy fuel supply control requirement, and a variation in supplied pressure of the oxidizing agent may result in a variation in supplied pressure of the fuel (i.e., hunting), which leads to instability of operation of the fuel cell.

Further, the moisture contained in the off-gas may freeze near the ejector nozzle in low-temperature environments, thereby resulting in changes in area of an outlet of the nozzle and state of a wall surface of the nozzle, which may cause a disturbance of control of flow rate of the off-gas.

SUMMARY OF THE INVENTION

It is therefore a principal object of the invention to avoid the disadvantages of the prior art.

It is another object of the invention to provide a fuel cell system which works to recirculate an off-gas and regulate pressure of fuel supplied to a fuel cell with high accuracy.

According to one aspect of the invention, there is provided a fuel cell system which may be employed in automotive vehicles. The fuel cell system comprises: (a) a fuel cell working to produce an electrical energy arising from chemical reaction of hydrogen with oxygen; (b) a hydrogen supply line supplying a hydrogen gas from a hydrogen supply device to the fuel cell; (c) an off-gas recirculating line extending from the fuel cell to the hydrogen supply line; (d) an off-gas recirculating mechanism designed to recirculate an off-gas, which is discharged from the fuel cell and includes hydrogen having unreacted with the oxygen in the chemical reaction, to the fuel cell through the off-gas recirculating line, the off-gas recirculating mechanism being designed to be controllable of an amount of the off-gas recirculated, working to mix the off-gas flowing through the off-gas recirculating line with the hydrogen gas flowing through the hydrogen supply line to output a mixture gas to the fuel cell; (e) an output demand determining circuit working to determine a demand for output of the electrical energy from the fuel cell; and (f) a controller working to control the amount of the off-gas recirculated through the off-gas recirculating mechanism as a function of the demand for output of the electrical energy determined by the output demand determining circuit, thereby controlling an output pressure of the off-gas recirculating mechanism.

Use of the off-gas recirculating mechanism designed to be controllable of the amount of the off-gas recirculated results in a simplified structure of the system and increased accuracy of controlling the output pressure of the off-gas recirculating mechanism, that is, the pressure of the hydrogen gas inputted to the fuel cell.

In the preferred mode of the invention, the system further comprises a pressure sensor working to measure the output pressure of the off-gas recirculating mechanism. The control circuit controls the amount of the off-gas recirculated as a function of the output pressure measured by the pressure sensor.

The controller may monitor the output pressure of the off-gas recirculating mechanism to control the amount of the off-gas recirculated through the off-gas recirculating mechanism so as to bring the output pressure of the off-gas recirculating mechanism into agreement with a target one under feedback control.

The controller may alternatively monitor the output pressure of the off-gas recirculating mechanism to control the amount of the off-gas recirculated through the off-gas recirculating mechanism so as to have the output pressure of the off-gas recirculating mechanism fall within a target range under feedback control. When the output pressure of the off-gas recirculating mechanism lies within the target range, and an actual amount of the electrical energy produced by the fuel cell is smaller than the demand for output of the electrical energy from the fuel cell, the controller drains the off-gas from the off-gas recirculating line.

The off-gas recirculating mechanism may be implemented by an ejector vacuum pump which includes a nozzle having an outlet from which the hydrogen gas is discharged and is so designed as to be controllable of an area of the outlet of the nozzle.

The ejector vacuum pump has a tapered needle disposed within the nozzle coaxially therewith to be movable selectively in a first direction in which the tapered needle approaches the outlet of the nozzle and in a second direction in which the tapered needle moves away from the outlet of the nozzle, thereby changing the area of the outlet of the nozzle.

The system further includes an actuator which is electrically operable to move the tapered needle in a selected one of the first and second directions.

The system may also include a heater working to heat the off-gas recirculating mechanism. The heater is so installed as to extend from the outlet of the nozzle ranging downwardly of a flow of the hydrogen gas. The heater may be implemented by a PTC heater.

The system may also include a hydrogen supply pressure regulating mechanism working to regulate a pressure of the hydrogen gas outputted from the hydrogen supply device.

According to the second aspect of the invention, there is provided a fuel cell system comprising: (a) a fuel cell working to produce an electrical energy arising from chemical reaction of hydrogen with oxygen; (b) a hydrogen supply line supplying a hydrogen gas from a hydrogen supply device to the fuel cell; (c) an off-gas recirculating line extending from the fuel cell to the hydrogen supply line; and (d) an off-gas recirculating mechanism designed to recirculate an off-gas, which is discharged from the fuel cell and includes hydrogen having unreacted with the oxygen in the chemical reaction, to the fuel cell through the off-gas recirculating line. The off-gas recirculating mechanism works to mix the off-gas flowing through the off-gas recirculating line with the hydrogen gas flowing through the hydrogen supply line to output a mixture gas to the fuel cell. The off-gas recirculating mechanism is responsive to a pressure of the mixture gas outputted from the off-gas recirculating mechanism to bring the pressure of the mixture gas into agreement with a target one.

In the preferred mode of the invention, the off-gas recirculating mechanism is implemented by an ejector vacuum pump which includes a nozzle having an outlet from which the hydrogen gas is discharged and is so designed as to be variable of an area of the outlet of the nozzle in response to the pressure of the mixture.

The ejector vacuum pump may have a tapered needle disposed within the nozzle coaxially therewith to be movable selectively in a first direction in which the tapered needle approaches the outlet of the nozzle and in a second direction in which the tapered needle moves away from the outlet of the nozzle, thereby changing the area of the outlet of the nozzle.

The ejector vacuum pump has an elastic actuator which is elastically responsive to the pressure of the mixture to move the tapered needle in a selected one of the first and second directions.

The elastic actuator may be implemented by a spring such as a bellows.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 3 is a flowchart of a program performed by controllers of the fuel cell system of FIG. 1;

DESCRIPTION OF THE PREFERRED EMBODIMENTS

Figure 1:
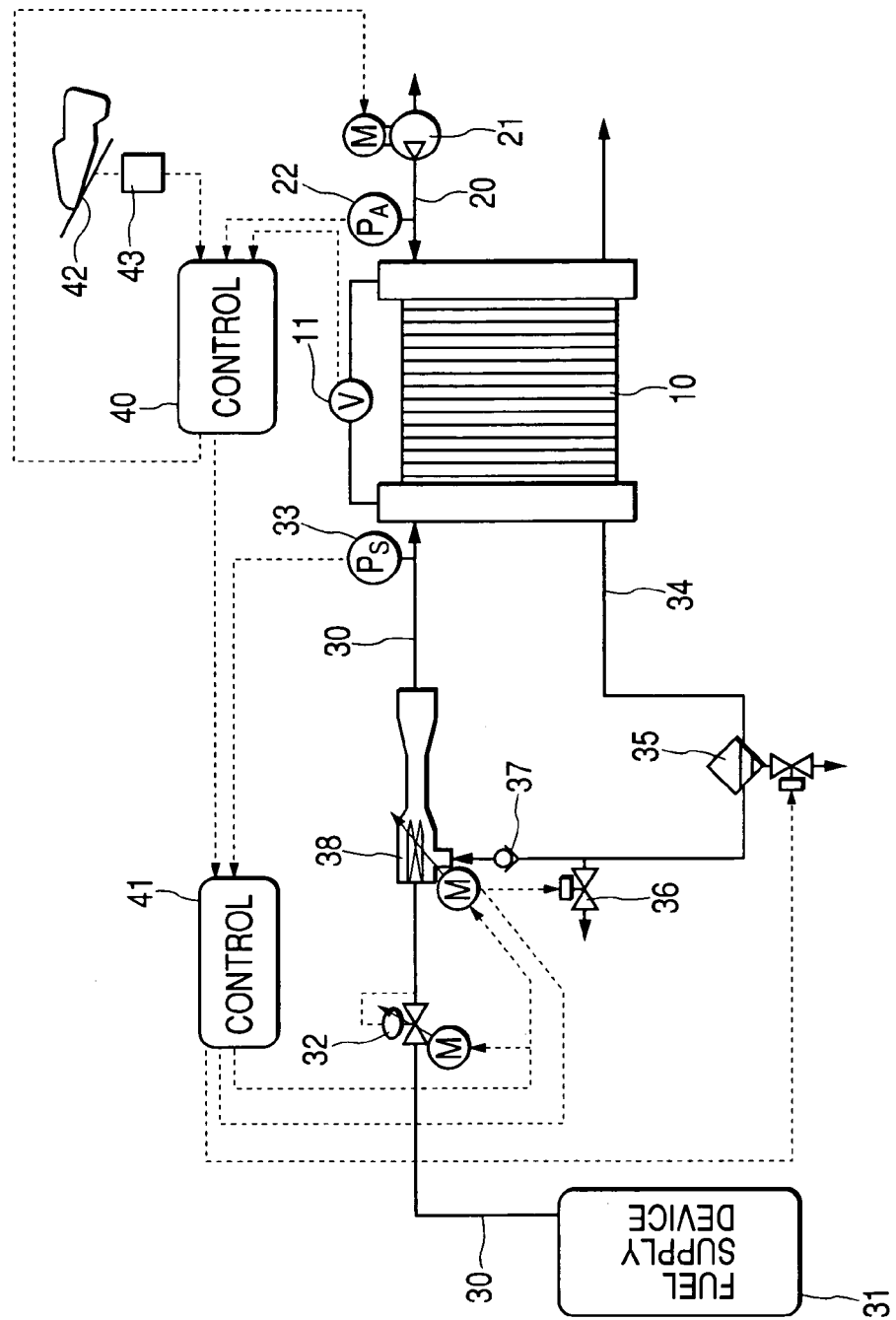
FIG. 1 is a circuit diagram which shows a fuel cell system according to the first embodiment of the invention.

Referring to the drawings, wherein like reference numbers refer to like parts in several views, particularly to FIG. 1, there is shown a fuel cell system according to the first embodiment of the invention which consists essentially of a fuel cell stack 10, an air supply device 21, a fuel supply device 31, an ejector vacuum pump 38, and controllers 40 and 41.

The fuel cell stack 10 works to convert the energy produced by electrochemical reaction of hydrogen, i.e., fuel and oxygen, i.e., emulsifying agent into electric power. The fuel cell stack 10 is made up of a plurality of solid polyelectrolyte fuel cells. Each cell is made of a pair of electrodes (will also called an oxygen and a hydrogen electrode below) and an electrolyte film disposed between the electrodes. The fuel cell stack 10 is used to supply the power to an electrical device such as a drive motor or a storage battery. The fuel cell stack 10 is supplied with hydrogen and air (oxygen) and induces electrochemical reactions thereof at the electrodes which are of the forms:

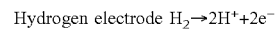

Hydrogen electrode $H_2 \rightarrow 2H^+ + 2e^-$

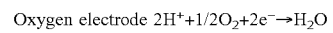

Oxygen electrode $2H^+ + 1/2O_2 + 2e^- \rightarrow H_2O$

The above electrochemical reactions produce water. Additionally, humidified hydrogen and air gasses are supplied into the fuel cell stack 10, which will cause condensate water to be produced therein. The moisture is, thus, produced within the fuel cell stack 10. The fuel cell stack 10 has disposed thereon a voltage sensor 11 which works to measure an output voltage of the fuel cell stack 10 and outputs a signal indicative thereof to the controller 40.

The fuel cell system also has an air supply line 20 for supplying oxygen-contained air to the oxygen electrodes (i.e., positive electrodes) of the fuel cell stack 10 and a hydrogen supply line 30 for supplying hydrogen gas to the hydrogen electrodes (i.e., negative electrodes) of the fuel cell stack 10. The fuel cell system further includes an air supply pressure sensor 22 and a hydrogen supply pressure sensor 33. The air supply pressure sensor 22 is installed in the air supply line 20 near an air inlet of the fuel cell stack 10 and works to measure the pressure of air supplied to the fuel cell stack 10. The hydrogen supply pressure sensor 33 is installed in the hydrogen supply line 30 near a hydrogen gas inlet of the fuel cell stack 10 and works to measure the pressure of hydrogen gas supplied to the fuel cell stack 10. The pressure of hydrogen gas supplied to the fuel cell stack 10 is substantially equal to an output pressure of the ejector vacuum pump 38.

An off-gas recirculating line 34 is disposed between a hydrogen outlet of the fuel cell stack 10 and a portion of the hydrogen supply line 30 located downstream of a regulator 32. The off-gas recirculating line 34 works to combine an off-gas containing unreacted hydrogen gas discharged from the fuel cell stack 10 with a main flow of the hydrogen gas to the fuel cell stack 10. The off-gas recirculating line 34 has disposed therein an gas-liquid separator 35, a drain valve 36, and a check valve 37. The gas-liquid separator 35 works to separate moisture from the off-gas. The drain valve 36 works to discharge the off-gas outside the fuel cell system. The check valve 37 works to avoid a backflow of the off-gas when discharged outside the fuel cell system. The moisture separated by the gas-liquid separator 35 is drained by opening a drain valve installed beneath the gas-liquid separator 35, as viewed in the drawing.

The ejector vacuum pump 38 is installed at a junction of the off-gas recirculating line 34 and the hydrogen supply line 30. The ejector vacuum pump 38, as will be described later in detail, works to suck therein the off-gas using fluid energy developed by a flow of the hydrogen gas outputted from the fuel supply device 31 and recirculate it to the fuel cell stack 10.

The fuel cell system, as described above, has the two controllers 40 and 41 implemented by electronic control units. The first controller 40 receives an output signal of an accelerator position sensor 43 indicating a position of an accelerator pedal 42 of an automotive vehicle, for example, and calculates a required amount of electricity to be generated by the fuel cell stack 10 based on the position of the accelerator pedal 42. The first controller 40 also works to calculate amounts of hydrogen gas and off-gas and a supply pressure of the hydrogen gas (i.e., the output pressure of the ejector vacuum pump 38) needed for the fuel cell stack 10 to generate the required amount of electricity and outputs a command signal to the second controller 41.

In this embodiment a ratio of the amount of hydrogen gas supplied from the fuel supply device 31 to the amount of off-gas to be recirculated to the fuel cell stack 10 is a fixed value (e.g., 1:0.2). A determination of the recirculated amount of off-gas is, thus, made by determining the supplied amount of hydrogen gas. The first controller 40 has disposed therein a map listing a relation among the amount of hydrogen gas required to be supplied to the fuel cell stack 10, the amount of off-gas required to be recirculated to the fuel cell stack 10, and the pressure required to supply the hydrogen gas to the fuel cell stack 10.

The first controller 40 also calculates the amount of air required for the fuel cell stack 10 to generate the required amount of electricity and control the speed of a compressor 21. Specifically, the first controller 40 monitors an output of the air supply pressure sensor 22 to modify the speed of the compressor 21 under feedback control. The first controller 40 also controls the generation of electricity in the fuel cell stack 10 based on an output of the voltage sensor 11.

The second controller 41 receives a control signal from the first controller 40 and an output of the hydrogen supply pressure sensor 33. The second controller 41 calculates a target valve open position of a regulator 32 based on the required amount of hydrogen gas supplied and a nozzle open position of the ejector vacuum pump 34 based on the required amount of off-gas recirculated and outputs control signals to the regulator 32 and the ejector vacuum pump 38. The second controller 41 also outputs control signals to the gas-liquid separator 35 and the drain valve 36.

Figure 2:
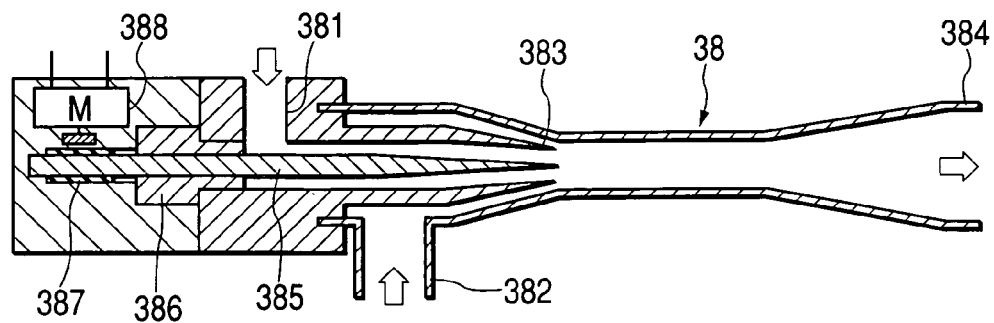
FIG. 2 is a longitudinal sectional view which shows an ejector vacuum pump used in the fuel cell system of FIG. 1.

The ejector vacuum pump 38, as clearly shown in FIG. 2, includes a hydrogen inlet port 381, an off-gas inlet port 382, a nozzle 383, an output 384, a movable needle 385, a needle guide 386, a worm gear 387, and an electric motor 388.

The hydrogen inlet port 381 leads to the hydrogen supply line 30. The off-gas inlet port 382 connects with the off-gas recirculating line 34. The nozzle 383 is made of a hollow cylinder which has an inner fluid path. The nozzle 383 is installed within a hollow cylindrical pump housing to define an outer fluid path between an outer all of the nozzle 383 and an inner wall of the pump housing. The inner fluid path communicates with the hydrogen inlet port 381. The outer fluid path communicates with the off-gas inlet port 382. The inner fluid path has a tapered outlet which works to output a high-speed flow of the hydrogen gas.

The high-speed flow of the hydrogen gas travels to the outlet 384 while drawing the off-gas thereinto. Specifically, the high-speed flow results in generation of a negative pressure or vacuum around the periphery of the nozzle 383, thereby sucking the off-gas flowing through the off-gas recirculating line 34 into the flow of hydrogen gas, so that a mixture of the off-gas and the hydrogen gas is discharged from the outlet 384 and supplied to the fuel cell stack 10 through the hydrogen supply line 30.

The ejector vacuum pump 38, as described above, has the movable needle 385 disposed within the nozzle 383 coaxially therewith. The movable needle 385 is mechanically coupled with an output shaft of the motor 388 through the worm gear 387, so that it may move in a lengthwise direction thereof within the nozzle 383 to change a sectional area of the outlet of the nozzle 383. Specifically, the needle 385 has a tapered head which is moved by the motor 388 to adjust the sectional area of the outlet of the nozzle 383 to a desired one. When the needle 385 is moved inwardly of the nozzle 383 (i.e., the left direction as viewed in the drawing), the sectional area of the outlet of the nozzle 383 increases, while when the needle 385 is moved outwardly of the nozzle 383, the sectional area of the outlet of the nozzle 383 decreases.

The adjustment of output gas pressure of the ejector vacuum pump 38 and the amount of off-gas recirculated is achieved by changing the open area of the nozzle 383. The output gas pressure of the ejector vacuum pump 38 is the pressure of the mixture of hydrogen gas and off-gas to be supplied from the ejector vacuum pump 38 to the fuel cell stack 10. Specifically, when the open area of the nozzle 383 is decreased, it results in decreases in flow velocity of the hydrogen gas and amount of off-gas recirculated and an elevation in output gas pressure of the ejector vacuum pump 38. Conversely, when the open area of the nozzle 383 is decreased, it results in increases in flow velocity of the hydrogen gas and amount of off-gas recirculated and reduction in output gas pressure of the ejector vacuum pump 38.

FIG. 3 is a flowchart of a sequence of logical steps or program performed by the controllers 40 and 41.

After entering the program, the routine proceeds to step 100 wherein the first controller 40 monitors an output of the accelerator position sensor 43, i.e., the position of the accelerator pedal 42 and determines the amount of electricity Wo required for the fuel cell stack 10 to generate the electricity.

The routine proceeds to step 101 wherein the first controller 40 determines the required amount of hydrogen gas to be supplied to the fuel cell stack 10, the required amount of off-gas to be recirculated to the fuel cell stack 10, and the required pressure Po of the hydrogen gas as a function of the required amount of electricity Wo. This determination is made by look-up using the map, as described above, listing the relation among the required amount of hydrogen gas, the required amount of off-gas, and the required pressure of the hydrogen gas.

The routine proceeds to step 102 wherein the second controller 41 controls the valve open position of the regulator 32 and the nozzle open position of the ejector vacuum pump 38. The routine proceeds to step 103 wherein an actual pressure Ps of the hydrogen gas supplied to the fuel cell stack 10 is monitored through an output of the hydrogen supply pressure sensor 33 to determine whether the actual pressure Ps is controlled to the required pressure Po or not. Specifically, it is determined whether the actual pressure Ps lies within a range of the required pressure Po±α or not (α is a given control tolerance). If a NO answer is obtained meaning that the actual pressure Ps lies out of the range of the required pressure Po±α, then the routine proceeds to step 104 wherein it is determined whether the actual pressure Ps is greater or smaller than the range of Po±α to determine the direction in which the nozzle open position of the ejector vacuum pump 38 is to be corrected.

Specifically, if the actual pressure Ps is greater than Po+α, then the routine proceeds to step 105 wherein the nozzle open position or open area of the nozzle 383 of the ejector vacuum pump 38 is decreased, thereby increasing the flow velocity of the hydrogen gas supplied to the fuel cell stack 10. This results in an increase in amount of off-gas recirculated and a reduction in pressure of the hydrogen gas outputted from the ejector vacuum pump 38. Alternatively, if the actual pressure Ps is smaller than Po−α, then the routine proceeds to step 106 wherein the nozzle open position or open area of the nozzle 383 of the ejector vacuum pump 38 is increased, thereby decreasing the flow velocity of the hydrogen gas supplied to the fuel cell stack 10. This results in a decrease in amount of off-gas recirculated and an elevation in pressure of the hydrogen gas outputted from the ejector vacuum pump 38.

If it is determined in step 104 that the actual pressure Ps falls within the range of Po±α, then the routine proceeds to step 107 wherein an actual amount Wn of electricity produced by the fuel cell stack 10 is greater than or equal to the required amount Wo of electricity or not. If a YES answer is obtained meaning that the actual amount Wn fulfils the demand of electricity, then the routine terminates. Alternatively, if a NO answer is obtained, it is concluded that the lack in the actual amount Wn of electricity produced by the fuel cell stack 10 is due to a decrease in concentration of hydrogen contained in the off-gas. This is because the nitrogen contained in the air supplied to the oxygen electrodes of the fuel cell stack 10 travels to the hydrogen electrodes within an electrolyte film, thus resulting in a rise in concentration of nitrogen in the off-gas. The routine, thus, proceeds to step 108 wherein the drain valve 36 is opened to discharge the off-gas whose concentration of hydrogen is decreased outside the off-gas recirculating line 34, thereby recovering the lack in concentration of hydrogen within the off-gas. Afterward, the routine returns back to step 103 to control the pressure of hydrogen gas supplied to the fuel cell stack 10 again.

As apparent form the above discussion, the fuel cell system of this embodiment works to monitor an output of the hydrogen supply pressure sensor 33 to modify the open area of the outlet port of the ejector vacuum pump 38, thereby controlling the pressure of the hydrogen gas supplied to the fuel cell stack 10 (i.e., the output pressure of the ejector vacuum pump 38) and the amount of off-gas recirculated to the fuel cell stack 10. This eliminates the need for a plurality of pressure control valves employed in the conventional system as discussed in the introductory part of this application, thus resulting in a simplified structure and a decrease in manufacturing costs of the fuel cell system. Further, a lag in propagation of pressure within lines 30 and 34 is minimized. The pressure of the hydrogen gas supplied to the fuel cell stack 10 is insensitive to the pressure of air supplied to the fuel cell stack 10. It, therefore, becomes possible to control the pressure of the hydrogen gas supplied to the fuel cell stack 10 precisely. The use of the regulator 32 to control the pressure of the hydrogen gas results in an increase in controllable range of the output pressure of the ejector vacuum pump 38.

Figure 4:
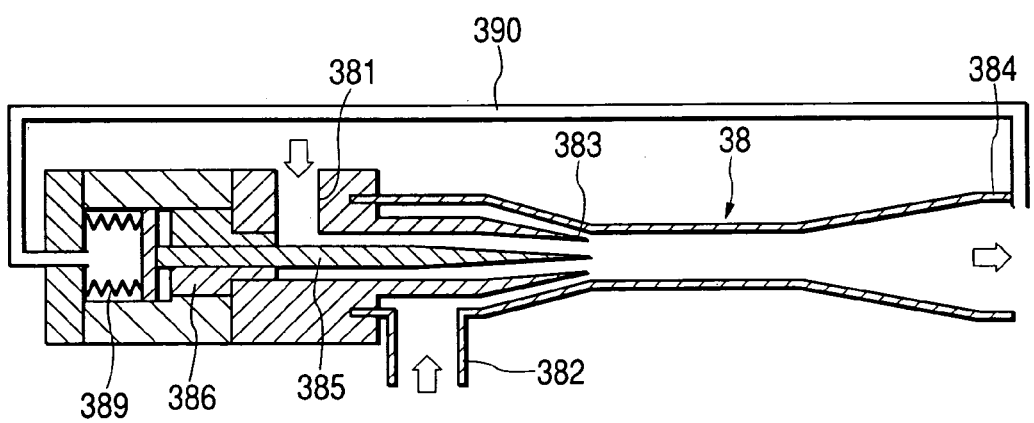
FIG. 4 is a longitudinal sectional view which shows an ejector vacuum pump according to the second embodiment of the invention.

FIG. 4 shows the ejector vacuum pump 38 according to the second embodiment of the invention. The same reference numbers as employed in the first embodiment refer to the same parts, and explanation thereof in detail will be omitted here.

The ejector vacuum pump 38 has a bellows 389 disposed within a chamber of the pump housing. The bellows 389 works as a spring to expand or contract in response to the output or discharge pressure of the ejector vacuum pump 38. The bellows 389 is secured to an end of the needle 385 to move the needle 385 in a lengthwise direction thereof. A discharge pressure transmitting line 390 extends from the outlet 384 of the ejector vacuum pump 38 inside the bellows 389 to apply the discharge pressure of the ejector vacuum pump 38 to the bellows 389.

When the discharge pressure of the ejector vacuum pump 38 rises, it will cause the bellows 389 to expand. Alternatively, when the discharge pressure of the ejector vacuum pump 38 drops, it will cause the bellows 389 to contract through its own spring pressure. Specifically, when the discharge pressure of the ejector vacuum pump 38 drops below a target value, it will cause the needle 385 to move in the left direction, as viewed in the drawing, thereby increasing the open area of the nozzle 383, which results in a decrease in amount of the off-gas recirculated and a rise in pressure of the hydrogen gas (i.e., the mixture of the off-gas and the hydrogen gas) supplied to the fuel cell stack 10. Conversely, when the discharge pressure rises above the target value, it will cause the needle 385 to move in the right direction, as viewed in the drawing, thereby decreasing the open area of the nozzle 383, which results in an increase in amount of the off-gas recirculated and a drop in pressure of the hydrogen gas supplied to the fuel cell stack 10.

Use of this type of ejector vacuum pump 38 enables the open area of the nozzle 383 to be regulated automatically as a function of the discharge pressure of the ejector vacuum pump 38, thus resulting in a further simplified structure of the fuel cell system.

Figure 5:
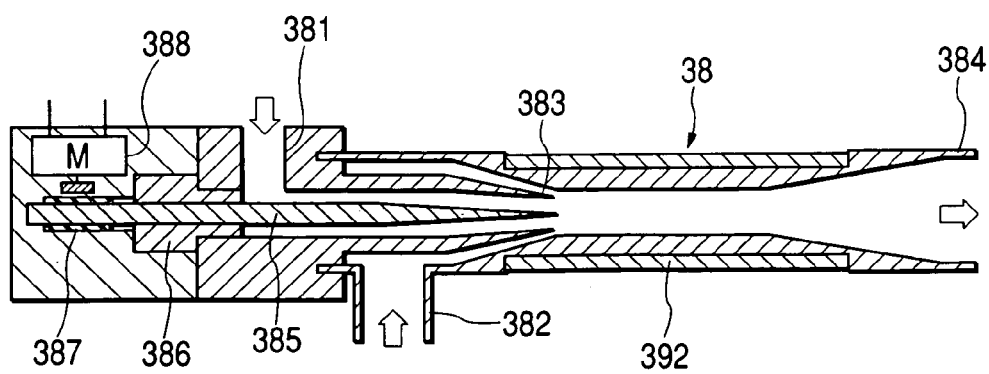
FIG. 5 is a longitudinal sectional view which shows an ejector vacuum pump according to the third embodiment of the invention.

FIG. 5 shows the ejector vacuum pump 38 according to the third embodiment of the invention. The same reference numbers as employed in the first embodiment refer to the same parts, and explanation thereof in detail will be omitted here.

The ejector vacuum pump 38 has disposed thereon a PTC (Positive Temperature Coefficient) heater 392 working to avoid condensation of moisture within the ejector vacuum pump 38 in low-temperature environments. The PTC heater 392 is installed on a portion of the pump housing within which the off-gas is mixed with the hydrogen gas. Specifically, the PTC heater 392 extends from the tip of the nozzle 383 to the downstream side of the outlet 384. The PTC element used in the heater 392, as is well known in the art, works as a constant-temperature heater which performs a temperature self-control function, thus eliminating the need for control of electrical energization thereof. This results in a simplified structure of the fuel cell system as compared with when a hot wire heater is employed.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

For example, the fuel cell system of the first embodiment works to control the open area of the nozzle 383 of the ejector vacuum pump 38 as a function of the discharge pressure thereof, but may use a flow rate of the off-gas as measured by an off-gas sensor instead of the discharge pressure of the ejector vacuum pump 38.

The fuel cell system of the third embodiment uses the PTC heater 392, but may alternatively employ another type of heater.

What is claimed is:

1. A fuel cell system comprising:
    a fuel cell working to produce an electrical energy arising from chemical reaction of hydrogen with oxygen;
    a hydrogen supply line supplying a hydrogen gas from a hydrogen supply device to said fuel cell;
    an off-gas recirculating line extending from said fuel cell to said hydrogen supply line;
    an ejector vacuum pump designed to recirculate an off-gas, which is discharged from said fuel cell and includes hydrogen having unreacted with the oxygen in the chemical reaction, to said fuel cell through said off-gas recirculating line, said ejector vacuum pump being designed to be controllable of an amount of the off-gas recirculated, working to mix the off-gas flowing through said off-gas recirculating line with the hydrogen gas flowing through said hydrogen supply line to output a mixture gas to said fuel cell;
    an output demand determining circuit working to determine a demand for output of the electrical energy from said fuel cell;
    a pressure sensor working to measure an output pressure of said ejector vacuum pump; and
    a controller working to determine the amount of the off-gas to be recirculated through said ejector vacuum pump as a function of the demand for output of the electrical energy determined by said output demand determining circuit, said controller also regulating an open area of an outlet of said ejector vacuum pump based on the output pressure measured by said pressure sensor to control the amount of the off-gas recirculated through said ejector vacuum pump.

2. A fuel cell system as set forth in claim 1, wherein said controller monitors the output pressure of said ejector vacuum pump to control the amount of the off-gas recirculated through said ejector vacuum pump so as to bring the output pressure of said ejector vacuum pump into agreement with a target value under feedback control.

3. A fuel cell system as set forth in claim 1, wherein said controller monitors the output pressure of said ejector vacuum pump to control the amount of the off-gas recirculated through said ejector vacuum pump so as to have the output pressure of said ejector vacuum pump fall within a target range under feedback control.

4. A fuel cell system as set forth in claim 3, wherein when the output pressure of said ejector vacuum pump lies within the target range, and an actual amount of the electrical energy produced by said fuel cell is smaller than the demand for output of the electrical energy from said fuel cell, said controller drains the off-gas from said off-gas recirculating line.

5. A fuel cell system as set forth in claim 1, wherein said ejector vacuum pump includes a nozzle having an outlet from which the hydrogen gas is discharged and is so designed as to be controllable of an area of the outlet of the nozzle.

6. A fuel cell system as set forth in claim 5, wherein said ejector vacuum pump has a tapered needle disposed within the nozzle coaxially therewith to be movable selectively in a first direction in which the tapered needle approaches the outlet of the nozzle and in a second direction in which the tapered needle moves away from the outlet of the nozzle, thereby changing the area of the outlet of the nozzle.

7. A fuel cell system as set forth in claim 6, further comprising an actuator which is electrically operable to move the tapered needle in a selected one of the first and second directions.

8. A fuel cell system as set forth in claim 1, further comprising a heater working to heat said ejector vacuum pump.

9. A fuel cell system as set forth in claim 8, wherein said heater is so installed as to extend from the outlet of the nozzle ranging downwardly of a flow of the hydrogen gas.

10. A fuel cell system as set forth in claim 8, wherein said heater is implemented by a PTC heater.

11. A fuel cell system as set forth in claim 1, further comprising a hydrogen supply pressure regulating mechanism working to regulate a pressure of the hydrogen gas outputted from said hydrogen supply device.

12. A fuel cell system comprising:
    a fuel cell working to produce an electrical energy arising from chemical reaction of hydrogen with oxygen;
    a hydrogen supply line supplying a hydrogen gas from a hydrogen supply device to said fuel cell;
    an off-gas recirculating line extending from said fuel cell to said hydrogen supply line; and
    an off-gas recirculating mechanism designed to recirculate an off-gas, which is discharged from said fuel cell and includes hydrogen having unreacted with the oxygen in the chemical reaction, to said fuel cell through said off-gas recirculating line, said off-gas recirculating mechanism working to mix the off-gas flowing through said off-gas recirculating line with the hydrogen gas flowing through said hydrogen supply line to output a mixture gas to said fuel cell, said off-gas recirculating mechanism being responsive to a pressure of the mixture gas outputted from said off-gas recirculating mechanism to bring the pressure of the mixture gas into agreement with a target value, wherein said off-gas recirculating mechanism is implemented by an ejector vacuum pump which includes a nozzle having an outlet from which the hydrogen gas is discharged and is so designed as to be variable of an area of the outlet of the nozzle in response to the pressure of the mixture.

13. A fuel cell system as set forth in claim 12, wherein said ejector vacuum pump has a tapered needle disposed within the nozzle coaxially therewith to be movable selectively in a first direction in which the tapered needle approaches the outlet of the nozzle and in a second direction in which the tapered needle moves away from the outlet of the nozzle, thereby changing the area of the outlet of the nozzle.

14. A fuel cell system as set forth in claim 13, wherein said ejector vacuum pump has an elastic actuator which is elastically responsive to the pressure of the mixture to move the tapered needle in a selected one of the first and second directions.

15. A fuel cell system as set forth in claim 14, wherein the elastic actuator is implemented by a spring.

* * * * *